(12) United States Patent
Fang et al.

(10) Patent No.: US 10,140,189 B2
(45) Date of Patent: *Nov. 27, 2018

(54) DATABASE RECOVERY AND INDEX REBUILDS

(71) Applicant: International Business Machines Corporation, Armonk, NY (US)

(72) Inventors: Min Fang, Beijing (CN); Di Jin, Beijing (CN); Zhen Yu Shi, Beijing (CN); Nigel G. Slinger, Los Gatos, CA (US); Shu Wang, Beijing (CN); Li Fei Zheng, Shanghai (CN); Wen Jie Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 541 days.

This patent is subject to a terminal disclaimer.

(21) Appl. No.: 14/697,794

(22) Filed: Apr. 28, 2015

(65) Prior Publication Data

US 2016/0321142 A1    Nov. 3, 2016

(51) Int. Cl.
*G06F 17/30* (2006.01)
*G06F 11/14* (2006.01)

(52) U.S. Cl.
CPC ...... *G06F 11/1471* (2013.01); *G06F 11/1446* (2013.01); *G06F 11/1451* (2013.01);
(Continued)

(58) Field of Classification Search
CPC ............ G06F 11/1471; G06F 2201/80; G06F 11/1446; G06F 2201/84; G06F 11/1451;
(Continued)

(56) References Cited

U.S. PATENT DOCUMENTS 6,119,128 A    9/2000  Courter et al.
7,222,133 B1   5/2007  Raipurkar et al.
(Continued)

OTHER PUBLICATIONS

Talius et al., "Transaction Log Based Application Error Recovery and Point In-Time Query," Proceedings of the VLDB Endowment, vol. 5, Issue 12, Aug. 2012. pp. 1781-1789. DOI: 10.14778/2367502.2367517.

(Continued)

*Primary Examiner* — Mark D Featherstone
*Assistant Examiner* — Faezeh Forouharnejad
(74) *Attorney, Agent, or Firm* — Peter J. Edwards

(57) ABSTRACT

A computer-implemented method for recovering data and concurrently rebuilding indexes for the recovered data in a database for a system configured to store fewer than all indexes in backup files may include copying data from one or more database files and storing the copied data to one or more backup files. A recovery manager executing on a processor may read the copied data from the one or more backup files and write the copied data to the one or more database files, wherein the data is recovered to the one or more database files. In response to the reading, an index manager executing on the processor may initiate a rebuilding of one or more indexes for the copied data at substantially the same time as the reading of the copied data.

7 Claims, 5 Drawing Sheets

(52) U.S. Cl.
CPC ...... *G06F 11/1469* (2013.01); *G06F 11/1474* (2013.01); *G06F 17/30336* (2013.01); *G06F 17/30368* (2013.01); *G06F 2201/80* (2013.01); *G06F 2201/84* (2013.01)

(58) Field of Classification Search
CPC ........... G06F 11/1474; G06F 17/30336; G06F 11/1469
See application file for complete search history.

(56) References Cited

U.S. PATENT DOCUMENTS

| | | | |
|---|---|---|---|
| 8,200,633 B2* | 6/2012 | Bendakovsky | G06F 11/1458 707/640 |
| 8,521,695 B2 | 8/2013 | Zwilling et al. | |
| 8,666,944 B2 | 3/2014 | Beatty et al. | |
| 2004/0267835 A1* | 12/2004 | Zwilling | G06F 11/1451 |
| 2007/0226235 A1* | 9/2007 | Fuh | G06F 17/30371 |
| 2010/0250493 A1* | 9/2010 | Adkins | G06F 17/30088 707/639 |
| 2014/0074790 A1 | 3/2014 | Berman et al. | |
| 2014/0136484 A1 | 5/2014 | Beatty et al. | |

OTHER PUBLICATIONS

U.S. Appl. No. 14/697,794, filed Apr. 28, 2015
U.S. Appl. No. 15/166,390, filed May 27, 2016.
Fang et al., "Database Recovery and Index Rebuilds," U.S. Appl. No. 15/166,390, filed May 27, 2016.
List of IBM Patents or Patent Applications Treated as Related, dated May 12, 2016, 2 pages.

\* cited by examiner

DATABASE RECOVERY AND INDEX REBUILDS

BACKGROUND

This disclosure relates generally to database recovery, and more specifically, to point in time recovery and rebuilding indexes.

Database recovery has traditionally been utilized to recover data that has been lost from hardware disasters or user errors. For example, data loss may result from media errors, natural disasters that cause data crash, or a user may delete a table by mistake. Various backup mechanisms may be utilized to recover data for different purposes. For example, a full database backup provides a complete archive of a database as it existed at the time a backup operation finished, which may be useful when hardware disasters occur. Another recovery mechanism is a snapshot, which may be utilized when user errors have occurred or for reporting purposes. A snapshot is a read-only image copy of a database as it existed at the time of the snapshot creation. Some of the snapshot data (e.g., database records that have been deleted in a database file) may be written to a backup file (e.g., a sparse file) to store the data for recovery of the data at a later time.

In cases where a snapshot is utilized, database tools may provide a function to recover the database back to a specific time, which is known as "point in time recovery." The objects recovered may be data (e.g., database records, tables, etc.,), indexes, or both. Indexes may be utilized to sort various database records for particular columns in an organized fashion to allow efficient retrieval of the database records, as opposed to performing a full table scan to find the database records. Generally, there are two phases involved in point in time recovery. The RESTORE phase uses a snapshot of the database as a recovery base to replace the current database prior to a desired point in time. A LOGAPPLY phase scans database transaction logs and applies (writes) changes to the snapshot to get to a particular point in time or state of the database that the user desires.

SUMMARY

One or more embodiments are directed to a computer-implemented method for recovering data and concurrently rebuilding indexes for the recovered data in a database for a system configured to store fewer than all indexes in backup files. The method may include copying data from one or more database files and storing the copied data to one or more backup files. The method may further include reading the copied data from the one or more backup files, by a recovery manager executing on a processor, and writing the copied data to the one or more database files by the recovery manager, wherein the data is recovered to the one or more database files. In response to the reading, the method may also include initiating a rebuilding of one or more indexes for the copied data, by an index manager executing on the processor, at substantially the same time as the reading of the copied data.

One or more embodiments are directed to a system for recovering data and concurrently rebuilding indexes for the recovered data in a database for a system configured to store fewer than all indexes in backup files. The system may include a computing device having a processor and a memory. The memory may store program instructions, and the program instructions executable by the processor may cause the system to copy data from one or more database files and store the copied data to one or more backup files. The program instructions executable by the processor may further cause the system to read the copied data from the one or more backup files and write the copied data to the one or more database files, wherein the data is recovered to the one or more database files. The program instructions executable by the processor may further cause the system to initiate, in response to the reading, a rebuilding of one or more indexes for the copied data at substantially the same time as the reading of the copied data.

One or more embodiments are directed to a computer program product. The computer program product may include a computer readable storage medium having program code embodied therewith. The program code may include computer readable program code configured for copying data from one or more database files and storing the copied data to one or more backup files. The computer readable program code may also be configured for reading the copied data from the one or more backup files and writing the copied data to the one or more database files, wherein the data is recovered to the one or more database files. In response to the reading, the computer readable program code may further be configured for initiating a rebuilding of one or more indexes for the copied data at substantially the same time as the reading of the copied data.

Figure 1:
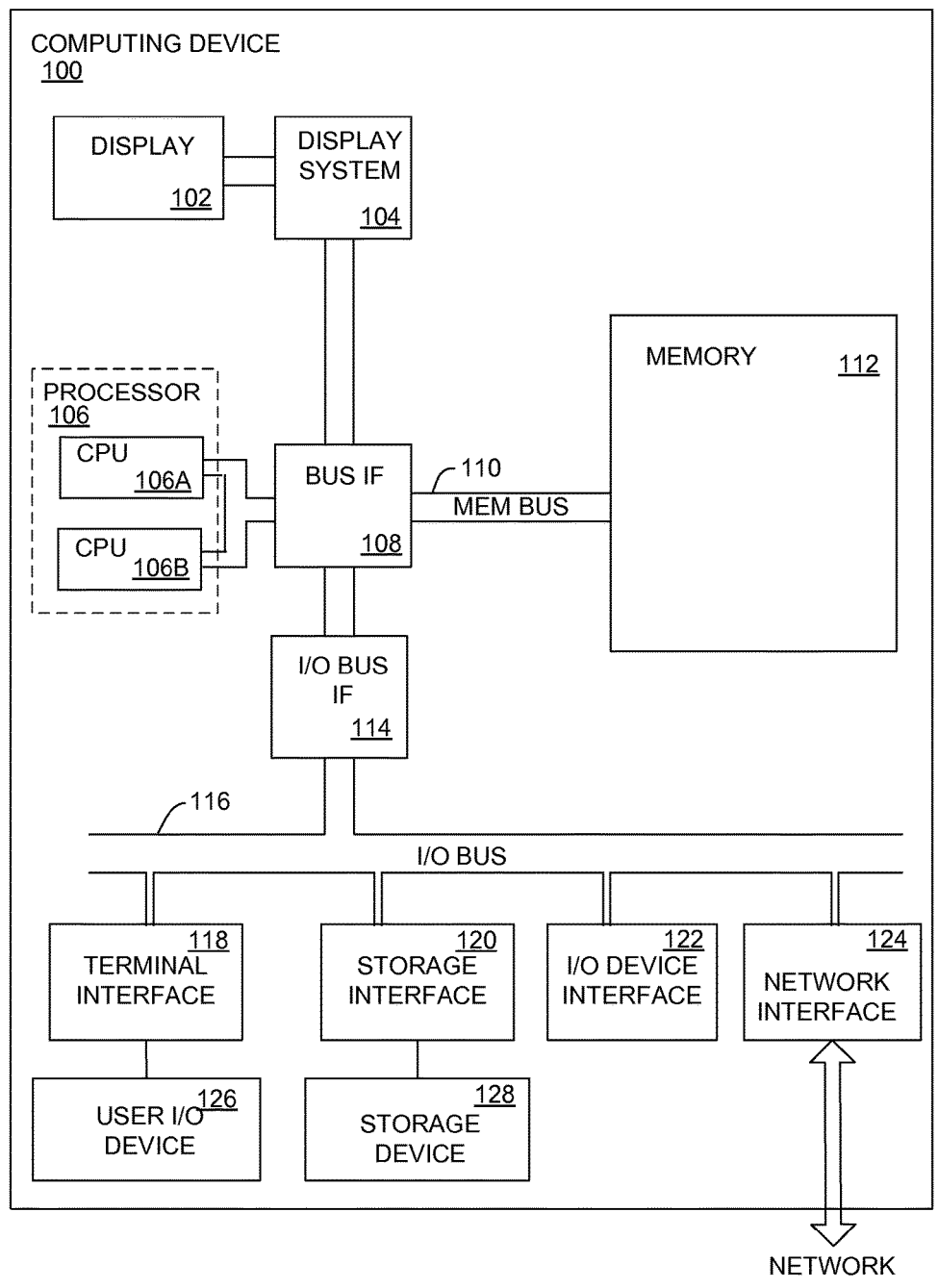
FIG. 1 is a block diagram of an example of a computing device, the computing device having a memory, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate generally to database recovery, and more specifically, to point in time recovery and rebuilding indexes. While the present disclosure is not necessarily limited to such application, various aspects of the disclosure may be appreciated through a discussion of various examples using this context.

A database user may utilize a snapshot for data only (e.g., database records) or for both data and indexes. However, snapshots that include both data and indexes may cause extended backup recovery time and may consume more physical space within storage devices (e.g., rotating magnetic disks) or memory. If the user utilizes a snapshot for data only, storage device space may be saved because index objects are not included in the snapshot image. However, the user may still have to rebuild the indexes derived from the data snapshot for efficient data retrieval. In various examples, if the user utilizes a snapshot for data only, a user may perform the RESTORE data and LOGAPPLY phases at a first time, and then rebuild all indexes only after the LOGAPPLY phase. However, during recovery time, the database object that corresponds to the data that was recovered may be locked such that no queries can access the data. Furthermore, during index rebuild, the index may not be able to be used. Therefore, queries may have to bypass the indexes, which may cause the database manager to perform a full table scan for accessing data. Moreover, a query request that includes various operations (e.g., insert, update, etc.) may even fail, as the index may be needed to complete the request but is locked. The overall effect may be a longer recovery time, which means that there may be a longer down time of the database. Accordingly, various embodiments of the present disclosure are directed to performing data recovery and rebuilding indexes at substantially the same time. This may help reduce the number input/outputs (I/O) operations and reduce overall down time for objects recovered. Therefore, data pages may only be read once for data recovery and index rebuild, as opposed to reading data pages at least twice—the first time to read data from backup file and restore it to the data file, and the second time to read the data to rebuild indexes.

FIG. 1 is a block diagram illustrating an exemplary embodiment of a computing device that includes a memory. The components of the computing device 100 can include one or more processors 106, a memory 112, a terminal interface 118, a storage interface 120, an Input/Output ("I/O") device interface 122, and a network interface 124, all of which are communicatively coupled, directly or indirectly, for inter-component communication via a memory bus 110, an I/O bus 116, bus interface unit ("IF") 108, and an I/O bus interface unit 114.

The computing device 100 may include one or more general-purpose programmable central processing units (CPUs) 106A and 106B, herein generically referred to as the processor 106. In an embodiment, the computing device 100 may contain multiple processors; however, in another embodiment, the computing device 100 may alternatively be a single CPU device. Each processor 106 executes instructions stored in the memory 112.

The computing device 100 may include a bus interface unit 108 to handle communications among the processor 106, the memory 112, the display system 104, and the I/O bus interface unit 114. The I/O bus interface unit 114 may be coupled with the I/O bus 116 for transferring data to and from the various I/O units. The I/O bus interface unit 114 may communicate with multiple I/O interface units 118, 120, 122, and 124, which are also known as I/O processors (IOPs) or I/O adapters (IOAs), through the I/O bus 116. The display system 104 may include a display controller, a display memory, or both. The display controller may provide video, audio, or both types of data to a display device 102. The display memory may be a dedicated memory for buffering video data. The display system 104 may be coupled with a display device 102, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 104 may be on board an integrated circuit that also includes the processor 106. In addition, one or more of the functions provided by the bus interface unit 108 may be on board an integrated circuit that also includes the processor 106.

The I/O interface units support communication with a variety of storage and I/O devices. For example, the terminal interface unit 118 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 126 and the computing device 100, may receive output data via the user output devices. For example, a user interface may be presented via the user I/O device 126, such as displayed on a display device, played via a speaker, or printed via a printer.

The storage interface 120 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 may be implemented via any type of secondary storage device. The contents of the memory 112, or any portion thereof, may be stored to and retrieved from the storage device 128 as needed. The I/O device interface 122 provides an interface to any of various other I/O devices or devices of other types, such as printers or fax machines. The network interface 124 provides one or more communication paths from the computing device 100 to other digital devices and computer systems.

Although the computing device 100 shown in FIG. 1 illustrates a particular bus structure providing a direct communication path among the processors 106, the memory 112, the bus interface 108, the display system 104, and the I/O bus interface unit 114, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 114 and the I/O bus 108 are shown as single respective units, the computing device 100, may include multiple I/O bus interface units 114 and/or multiple I/O buses 116. While multiple I/O interface units are shown, which separate the I/O bus 116 from various communication paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

In an embodiment, the memory 112 may include a random-access semiconductor memory, storage device, or storage medium (either volatile or non-volatile) for storing or encoding data and programs. In another embodiment, the memory 112 represents the entire virtual memory of the computing device 100, and may also include the virtual memory of other computer systems coupled to the computing device 100 or connected via a network 130. The memory 112 may be a single monolithic entity, but in other embodiments the memory 112 may include a hierarchy of caches and other memory devices. For example, memory may exist in multiple levels of caches, and these caches may be further divided by function, so that one cache holds instructions while another holds non-instruction data, which is used by the processor. Memory 112 may be further distributed and associated with different CPUs or sets of CPUs, as is known in any various so-called non-uniform memory access (NUMA) computer architectures.

Figure 2:
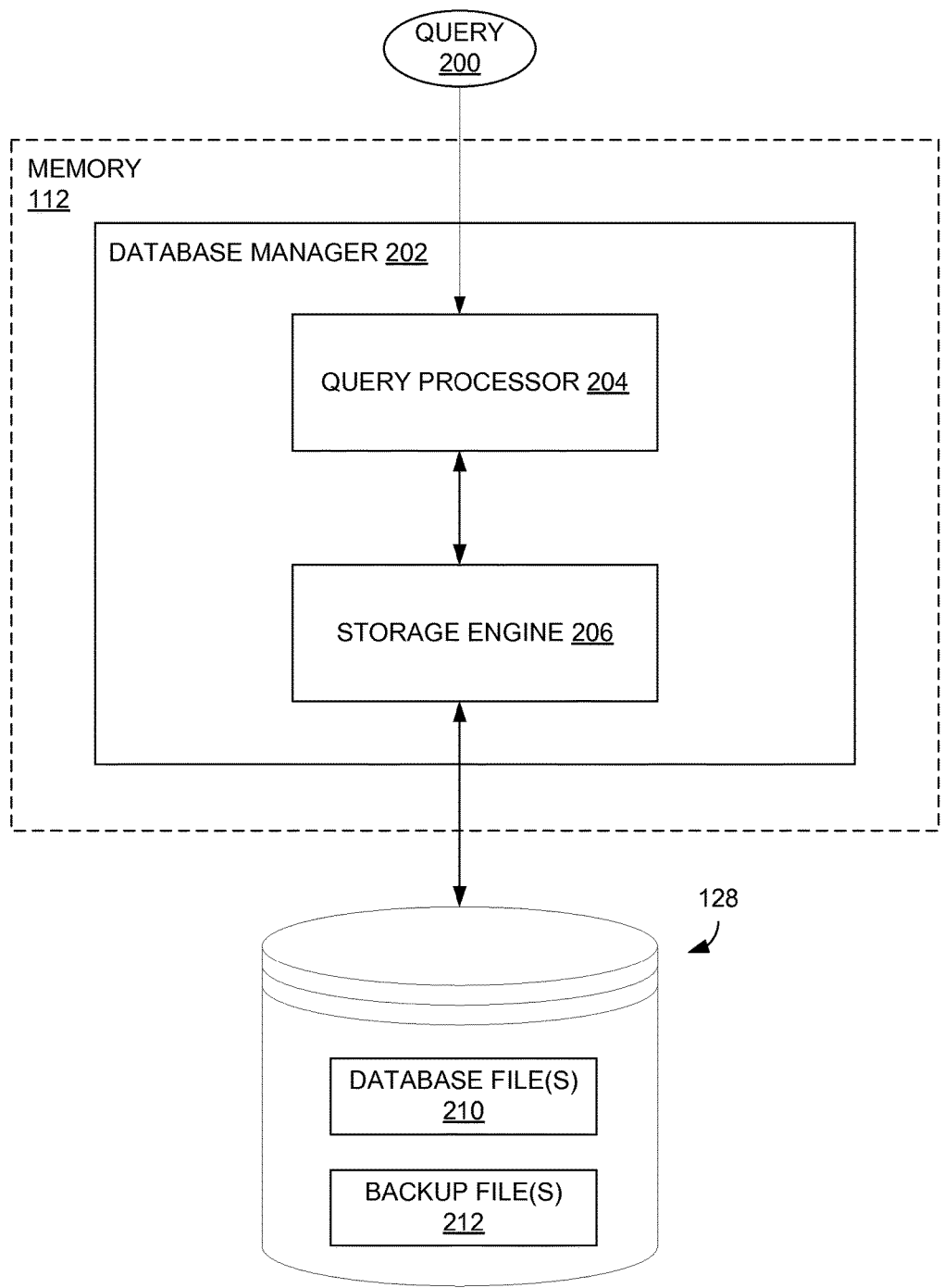
FIG. 2 is a block diagram illustrating an example of an embodiment of components and data that can reside in the memory of FIG. 1, including a storage engine.

The memory 112 may store all or a portion of the components and data shown in FIG. 2. These programs and data structures are illustrated in FIG. 2 as being included within the memory 112 in the computing device 100; however, in other embodiments, some or all of them may be on different computer systems and may be accessed remotely, e.g., via a network 130. The computing device 100 may use virtual addressing mechanisms that allow the programs of the computing device 100 to behave as if they only have access to a large, single storage entity instead of access to multiple, smaller storage entities. Thus, while the components and data shown in FIG. 2 are illustrated as being included within the memory 112, these components and data are not necessarily all completely contained in the same storage device at the same time. Although the components and data shown in FIG. 2 are illustrated as being separate entities, in other embodiments some of them, portions of some of them, or all of them may be packaged together.

In an embodiment, the components and data shown in FIG. 2 may include instructions or statements that execute on the processor 106 or instructions or statements that are interpreted by instructions or statements that execute the processor 106 to carry out the functions as further described below. In another embodiment, the components shown in FIG. 2 may be implemented in hardware via semiconductor devices, chips, logical gates, circuits, circuit cards, and/or other physical hardware devices in lieu of, or in addition to, a processor-based system. In an embodiment, the components shown in FIG. 2 may include data in addition to instructions or statements.

FIG. 1 is intended to depict representative components of the computing device 100. Individual components, however, may have greater complexity than represented in FIG. 1. In FIG. 1, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different ways, including using various computer applications, routines, components, programs, objects, modules, data structures etc., which may be referred to herein as "software," "computer programs," or simply "programs."

FIG. 2 is a block diagram illustrating an example embodiment of components and data that can reside in the memory of FIG. 1, including a storage engine 206. In embodiments, the database manager 202 may include a query processor 204 and a storage engine 206, which may interact with one or more database files 210 and one or more backup files 212 within the storage device 128. In various embodiments, these components and data are operable to copy data from one or more database files 210 and store the copied data to one or more backup files 212. Further they are operable to read the copied data from the one or more backup files 212 and write the copied data to the one or more database files 210 such that the data is recovered to the one or more database files. In some embodiments, a database manager 202 may initiate a rebuilding of one or more indexes for the copied data at substantially the same time as the reading of the copied data. Although FIG. 2 (and FIG. 3) illustrates that particular components are responsible for specific operations, any suitable component may perform any of the operations as described in the present disclosure. For example, although the present disclosure specifies that the reading and writing of the copied data occurs via a recovery manager, one or more other components may be responsible for the reading and writing, such as a log manager to determine a point in time needed for recovery.

Consistent with some embodiments, a user may issue a query 200 and the database manager 202 may receive the query 200 to create a snapshot of the storage device 128 to record a historical state of the database. For example, the query 200 may read "CREATE DATABASE SampleDBAsOfSnap AS SNAPSHOT OF SampleDB AS OF '2012-03-22 17: 26: 25. 473." The query 200 may specify restoring the copied data (e.g., snapshot sparse file data) from one or more backup files to one or more database files, and applying one or more log records to roll forward the transactional data derived from a desired point in time and writing it to the one or more database files (using, e.g., "RESTORE", "LOGAPPLY", "ROLL FORWARD," and/or "INSERT . . . SELECT" phases). The query 200 may be written in any suitable query language that corresponds to the desired database type. For example, the query 200 may be written in structured query language (SQL) for relational databases, data manipulation language (DML) for inserting, updating, or deleting database records in relational databases, multidimensional expression (MDX) for multidimensional or online analytical procession (OLAP) databases, or any other language for any other database. In some embodiments, a snapshot may be created via application tools instead of a query 200.

In an embodiment, the database manager 202 may initiate the process of selecting the one or more database records that are being requested from the query 200 by utilizing the query processor 204. In some embodiments, the query processor 204 may generate several plans to access database records and execute the most efficient plan. Alternatively, the query processor 204 may generate an efficient plan, which is not necessarily the most efficient. The query processor 204 may include such components as a compiler, a parser engine, an optimizer engine, and an execution engine. A compiler may receive the query 200 and convert the query 200 into machine-readable object code.

The parser engine may receive the compiled query 200 and check that the query 200 is correctly specified, resolve names and references, and convert the query 200 into a format utilized by the optimizer engine. The parser engine may convert the query 200 into a data structure, which gives a structural representation of the query 200. For example, the data structure may be an abstract syntax tree, parse tree, or other data structure. In various embodiments, the parser engine may make a plurality of checks, including a syntax check, a check determining whether the query 200 is meaningful, and a shared pool check.

In various embodiments, the optimizer engine receives the parsed query 200 to determine an efficient or most efficient query execution plan of selecting the one or more database records based on which database record(s) are requested in the query 200. Determining the efficiency of a plan may occur by determining the cost of each query execution plan through an estimator. In an embodiment, an estimator may estimate the cost of each query execution plan by measuring the units of work or resources used. For example, the estimator may use disk I/O, central processing unit (CPU) usage, and memory usage to calculate units of work. The cost of a query execution plan may accordingly represent a number of work units that are expected to be absorbed when the query 200 is executed and the results produced. In an embodiment, the execution engine receives an efficient or most efficient query execution plan according to the optimizer engine, and executes the query against the storage device 128. The execution engine may also order tables in any particular join order according to any join method, which is chosen by the optimizer engine. For example, the execution engine may run a nested loop, sort merge, or hash method as its chosen join method.

In various embodiments, the storage engine 206 may use the chosen query execution plan from the query processor 204 to select one or more database records from a database file(s) 210 or backup file(s) 212. In other embodiments, the one or more database records may be stored in the memory 112, and may therefore be selected from the memory 112. In some embodiments, the storage engine 206 may be a part of the execution engine of the query processor 204. The storage engine 206 provides interface between low level data stored in a database file(s) 210 or backup file(s) 212 and higher level applications. The storage engine 206 may interface with the database file(s) 210 or backup file(s) 212 by translating various query statements into low-level file system commands. For example, the storage engine 206 may be responsible for reading the copied data from one or more backup files 212 and writing the copied data to one or more database files 210 to recover data.

The backup file(s) 212 as described in the present disclosure may be considered any file, combination of files, or data objects that store historical data concerning how a database file 210 existed at various points in time, notwithstanding later modifications of the database file 210. For example, the backup file(s) 212 may be a sparse file used for snapshots, transaction log, a full backup file, a combination of the three, or any other suitable data object that records historical data. Consistent with some embodiments, before one or more database files 210 are modified, a user may issue a query 200 to create a snapshot of a plurality of database files 210 as they existed at a particular point in time. In some embodiments, the storage engine 206 may receive the query 200 and copy pages of data that will be modified in a database file(s) 210 and store the pages in a sparse file. Initially, a sparse file is an empty file of pages that contains no user data and has not been allocated disk space for user data. As more pages are modified or updated to the database file(s) 210, the size of the sparse file expands when more original pages from a database file(s) 210 are sent to the sparse file. Snapshots may utilize a sparse file for every database file 210 in the storage device 128. The snapshot may accordingly store one or more original pages of the database file(s) 210, which preserves the database records as they existed when the snapshot was performed. Consistent with some embodiments, when a read occurs to recover an entire database file 210 as it existed at a point in time, a read may be performed for data on both a sparse file for all of the pages that have been modified, and an original database file(s) 210 for data that has not been modified since a snapshot was taken.

In various embodiments, after the snapshot is created, the storage engine 206 may determine a log record (e.g., Split Log Sequence Number (LSN)), or other indicator, which represents the point in time to which recovery is desired after the snapshot. In an embodiment, the Split LSN is recorded in a transaction log. A transaction log (e.g., journal, journal receiver, database log, commit log, binary log, audit trail, etc.,) records all transactions (e.g., inserting, deleting, updating database records, etc.,) specific to the time they occur. In some embodiments, a standard crash recovery may be run on the snapshot and all of the transactions that are in an active (uncommitted) state may be rolled back or undone. Accordingly, none of these transactions may be a part of the snapshot. In some embodiments, a user may apply the log record changes from committed transactions of a transaction log to a current storage device 128 and roll forward the changes to restore a database file 210 to a particular point in time. In various embodiments, the initial step of snapshot creation translates specified wall-clock time (e.g., time elapsed according to a computer's internal clock) into the Split LSN by scanning the transaction log in memory or in the storage device 128. Consistent with some embodiments, the Split LSN search is optimized to first narrow down the transaction log region using checkpoint log records, which store wall-clock time and then by using transaction commit log records to find the actual Split LSN. In other embodiments, a user may specify a wall clock time for point in time restore operations after a full backup recovery. Accordingly, a storage engine 206 may read one or more log records from a transaction log, wherein the one or more log records are used to determine a particular point in time for recovery.

Figure 3:
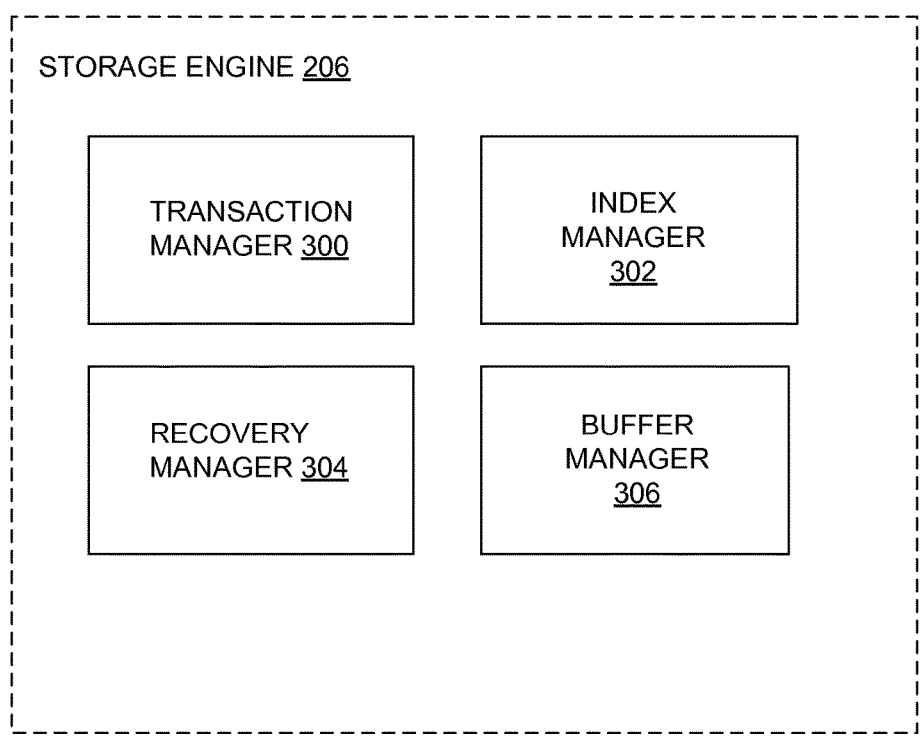
FIG. 3 is a block diagram illustrating an example of different components and data that can reside in the storage engine of FIG. 2, according to embodiments.

FIG. 3 is a block diagram illustrating an example of different components and data that can reside in the storage engine 206 of FIG. 2, according to embodiments. In an embodiment, the storage engine 206 may include a transaction manager 300, index manager 302, recovery manager 304, and a buffer manager 306.

The transaction manager 300 may be responsible for coordinating various transactions (also known as commit cycles). A transaction is one or more operations that make up a unit of work performed against a storage device 128. For example, a transaction may include the I/O operations of reading one or more database records, and updating the values of the database records. The updating operation value data may be stored in a sparse backup file 212 in some embodiments. Consistent with various embodiments, information about the reading and updating transaction may also be stored to a transaction log. For example, a log manager may write to a transaction log specifying that the reading and updating operations occurred at a particular time. This may be done to record the specific point in time such transaction took place in case of data recovery at a later time.

In various embodiments, a transaction may be in multiple states. For example, the transaction may be in in active state (uncommitted state). In an active state, a transaction has begun and is currently being executed by the transaction manager 300, which means that it has not finished. The transaction may also be in a partially committed state. In a partially committed state, the transaction manager 300 has executed its final operation without performing various checks (e.g., the consistency state of a storage device 128 after applying output of the transaction on the storage device 128). The transaction may be in a committed state. If the transaction manager 300 executes all of its operations successfully, which includes successfully performing various checks, then the transaction may be in a committed state. Accordingly, all of the committed transactions may permanently be applied to the storage device 128. The transaction may also be in a failed state (uncommitted state). If any checks made by the recovery manager 304 fails, the transaction may be in a failed state such that the transaction can no longer proceed. If any of the checks fail, and the transaction is in a failed state, the recovery manager 304 or transaction manager 300 may "rollback" any uncommitted transactions to place the storage device 128 in a state prior to the start of the execution of the transaction, which is called an aborted state (e.g., re-start transaction). Consistent with some embodiments, when the transaction is in an uncommitted state, the transaction manager 300 may generate data to be placed in a log record and request a log manager to write the contents of the log record to a transaction log in memory or corresponding storage device 128 when the transaction becomes committed. A recovery manager 304 may use the log record at a later time when a storage device 128 has been modified for point in time data recovery, as described below.

A recovery manager 304 may be utilized to recover data from one or more backup files 212 to one or more database files 210 according to how the one or more database files 210 existed at a particular point in time. Consistent with some embodiments, the recovery manager 304 may communicate with the buffer manager 306 to read copied data from one or more backup files 212 and write the copied data to the one or more database files 210 (if the data is not already in the one or more database files 210) to recover the data to a storage device 128. In some embodiments, the recovery manager 304 may perform the reading and writing by reading an image copy of one or more data pages of the copied data from a sparse backup file and writing the image copy from the sparse backup file to the one or more database files. In an illustrative example of data loss and recovery, a user may have mistakenly deleted several database records from a table at noon on a first day. A snapshot of the storage device 128 (the sparse files combined with current database files 210) may have been created at the beginning of the first day, but not any later. Accordingly, the image copy may include a database file as it existed at the beginning of the first day and be written to the storage device 128. As described in more below, a transaction log may be utilized to recover the data beginning from the first day until noon to arrive at the desired point in time needed for recovery.

As a part of the same data read as the reading of the image copy to restore the data base, the recovery manager 304 may also parse the one or more data pages of the image copy into database records and extract index keys from the database records. The recovery manager 304 may then sort the index keys in preparation for the rebuilding of one or more indexes. For example, a first level of extracted keys may be sorted to root node keys of column A, which are root values that identify on which page a particular value in a database record is indexed. A second level of extracted keys may be sorted to intermediate level keys of column A. The intermediate level keys may identify what particular page a database record or value is located on. A third level of extracted keys may be sorted to primary or secondary index keys, which may uniquely identify different database records for every table. The primary and secondary index keys may be sorted to be placed in various leaf nodes (e.g., the data pages or records of a B tree). These operations of extracting and sorting indexes may be utilized for preparing to rebuild indexes at substantially the same time (or substantially concurrently) as the reading of the data via an index manager 302.

The recovery manager 304 (or log manager) may also perform the reading and writing steps by reading (i.e., scanning) and applying (writing) one or more log records to the storage device 128 from a transaction log to roll forward the transactions to get to the desired point in time for recovery. For example, using the illustration above, the image copy of the database file 210 as it existed at the beginning of the first day may be read and written to the storage device 128 for initial recovery. In some embodiments, a transaction log may then be read and the transactions may be applied and written to the database files(s) 210 to capture all of the transactions that have occurred on the storage device 128 since the beginning of the first day up until noon on the first day (i.e., the time of the crash and the desired point in time to recover data to). Accordingly, applying the appropriate log records of a transaction log may allow for a more precise recovery of the desired data.

In some embodiments, the recovery manager 304 may perform the reading of the copied data from the one or more backup files 212 and the writing of the copied data to one or more database files 210 to recover the data in three distinct phases—the "restore phase," the "redo phase," and the "undo phase." In the RESTORE phase, a recovery manager 304 may read an image copy of one or more copied data pages from a sparse backup file 212 and write the one or more copied data pages to the database file(s) 210 to restore a storage device 128 that is prior to a point in time needed for recovery. In the "redo" (roll forward) phase, also known as the LOGAPPLY phase, the recovery manager 304 may read and apply (write) one or more log records from a transaction log to roll forward the transactions to get to the desired point in time for recovery. In an embodiment, when the recovery manager 304 "rolls forward" the one or more transactions, the corresponding values in the current database file 210 may be overwritten with the rolled forward information. For example, if a plurality of database records were altered by user error, the corresponding database records still stored on one or more backup files 212 may be rolled forward or re-written to the database file 210 within the storage device 128 such that the database records may be queried according to the values stored on the backup files 212. In the "undo phase," a recovery manager 304 may roll back any uncommitted transactions, which makes the database file 210 available to users. According to some embodiments, in this phase, the recovery manager 304 may scan a transaction log to identify any uncommitted transactions (e.g., transaction log bundles located in memory). The uncommitted transactions may be undone by being rolled back, unless they hold locks that prevent other transactions from viewing inconsistent transaction data.

Consistent with various embodiments of the present disclosure, the index manager 302 may be responsible for initiating a rebuilding of one or more indexes for the copied data at substantially the same time as the reading of the copied data. For example, the index manager 302 may start rebuilding indexes at 0.2 seconds, 0.3 seconds, 1 second, or any other suitable amount of time after the recovery manager 304 reads the copied data from one or more backup files 212 in preparation to recover the data. The recovery manager 304 may start the process of data recovery by reading an image copy of one or more copied data pages from a sparse backup file 212 and writing the one or more copied data pages to the database file(s) 210 to restore to a storage device 128 that is prior to a point in time needed for recovery. The recovery manager 304 may then extract index keys from database records according to the definition of indexes, and send the index keys along with Record Identification Numbers (RIDS) to parallel sort tasks. In various embodiments, the index manager 302 may then rebuild the one or more indexes by receiving the sorted index keys after index keys have been extracted from database records of the data, and rebuild the indexes according to how the index keys are sorted. For example, the index manager 302 may receive the root node index keys, the intermediate level index keys, and the sorted leaf node level keys and generate a corresponding index by generating a corresponding root node, intermediate level, and leaf nodes for various columns of different tables.

Consistent with some embodiments, the index manager 302 may finish the rebuilding of indexes before performing the "log apply" phase to retrieve the exact point in time of the snapshot needed, as opposed to rebuilding indexes after the "log apply" phase. The index manager 302 may rebuild or generate any suitable index for embodiments of the present disclosure, such as hash-based indexes, tree-based indexes (e.g., B+tree), or any other suitable index object type. The indexes may also be clustered, non-clustered, primary, secondary, dense, sparse, composite, unique, or configured in any other manner.

The buffer manager 306 may be responsible for interfacing with the storage device 128 in the various manners. The buffer manager 306 may read database file 210 pages into memory for performing the various tasks described above for reading copied data from one or more backup files 212 and writing the copied data to one or more database files 210. For example, in embodiments of the present disclosure the buffer manager 306 may store image copies of the data to one or more sparse backup files and store one or more log records to a transaction log backup file to record a state of a database at a particular point in time.

In order for the database manager 202 to perform an operation, the buffer manager 306 may select one or more database records that are requested based on a query 200. In various embodiments, the buffer manager 306 may select the one or more database records from different types of database files 210 or backup files 212 using different selection techniques. For example, the one or more database records may be selected from a database table data structure, and may have a relative record number ("RRN"). The RRN may indicate the database record's logical position in a database file table. For example, relative record numbers of the first, third, and fifth database records in a table may be 1, 3, and 5 respectively. In another embodiment, the data structure may be a simple file such as a binary large object (BLOB) or a character large object (CLOB). Alternatively, the data structure may be arrays with fixed-length entries, or a linked list. In an embodiment, the buffer manager 306 may utilize index structures to access and select the corresponding one or more database records, which groups ranges of database records together thereby making it easier for database record access.

The buffer manager 306 may select and read the one or more database records from the database file 210 or backup file 212 in various manners. For example, the buffer manager 306 may directly interface with the database file 210 or backup file 212 through a block device, such as a raw access storage device, wherein the buffer manager 306 bypasses the operating system's caches and buffers and accesses the database record (also known as a disk block or physical record). Alternatively, the buffer manager 306 may select and read the database record through a component of an operating system, called a disk manager, wherein the disk manager receives the low-level file system commands from the buffer manager 306 and manages disk space for storage in the database 210. For example, the disk manager may manage all of the backup files 212 for recovery.

Figure 4:
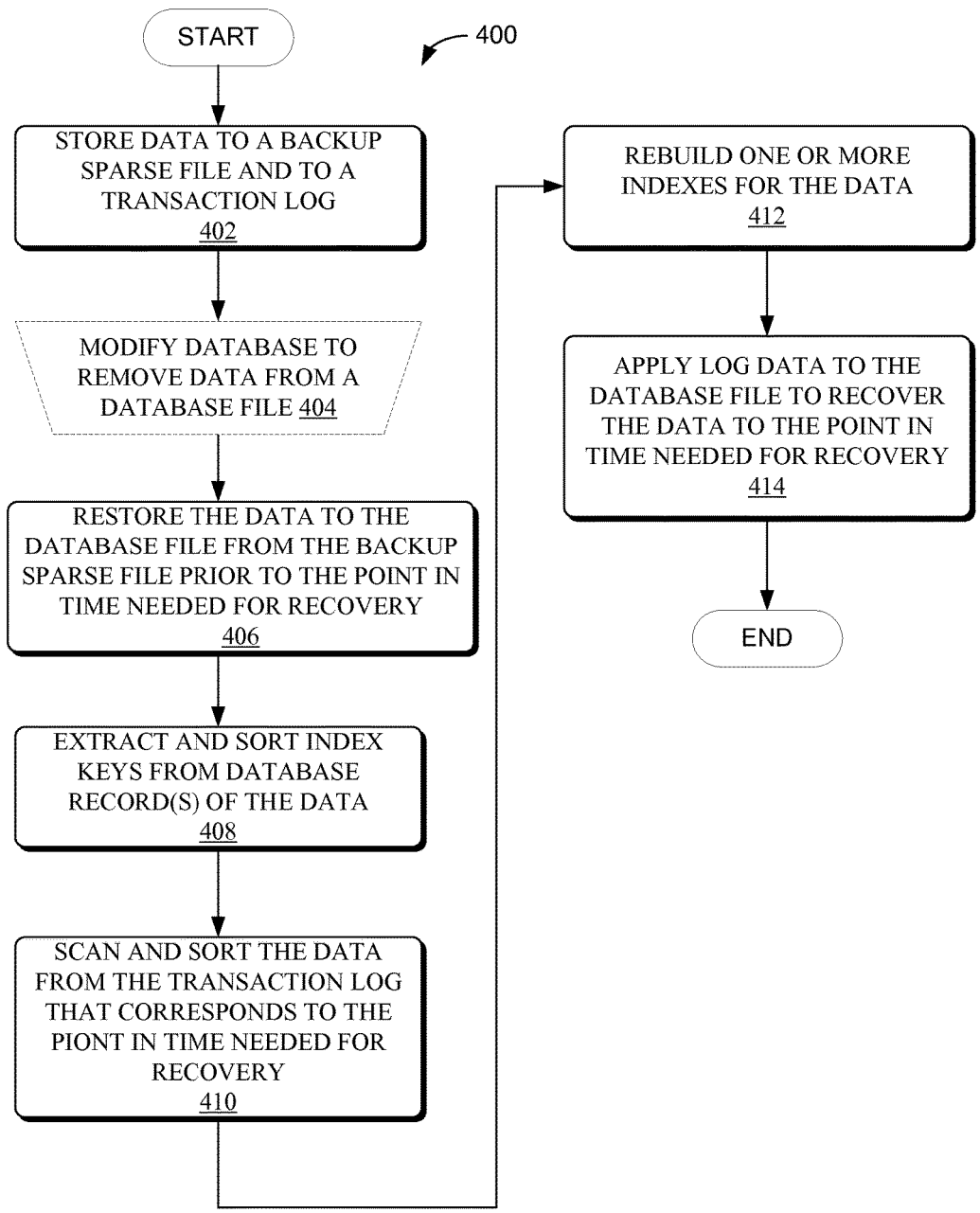
FIG. 4 is a flow diagram of an example process for recovering data and generating indexes for the data at substantially the same time as the recovering of the data, according to embodiments.

FIG. 4 is a flow diagram of an example process 400 for recovering data and generating indexes for the data at substantially the same time as the recovering of the data, according to embodiments. The process 400 may begin with operation 402. In one or more embodiments, a buffer manager may store image copies of the data to one or more sparse backup files and store one or more log records to one or more transaction log backup files to record a state of a database at a particular point in time. This may occur to later recover the data in case of a database crash or user error. Although FIG. 4 illustrates a particular order of operations, these operations can occur in any suitable order. For example, operation 410 may occur before operation 406.

In operation 404, a user may modify the one or more database files such that the data is no longer in the one or more database files. For example, a user may issue a query request to the database manager to change the data included in the one or more database files, which may be a user error (e.g., delete various needed database records from a table). Accordingly, the database manager may run the request to modify the database. In other embodiments, the data may no longer be in the one or more database files because the data may have simply been erased from a database file or memory due to a data crash.

Consistent with some embodiments, a recovery manager may perform operation 406 to restore the data from the sparse backup file prior to the point in time needed. Accordingly, the recovery manager may read the image copy of the one or more data pages of the data from the sparse backup file and write the one or more data pages to the one or more database files. This may be considered part of the RESTORE phase for embodiments of the present disclosure. In these embodiments, index pages may not be copied as part of the restore phase since indexes may be built according to the manner described below.

In various embodiments, a recovery manager may perform operation 408 to extract and sort index keys from database records. In these embodiments, the recovery manager may parse the one or more data pages into database records and extract index keys from the database records. The recovery manager may then sort the index keys in preparation for the generating of the one or more indexes.

In operation 410 and according to embodiments, a recovery manager (or log manager) may scan and sort the transaction log to obtain the log record transactions that correspond to the point in time needed for recovery. Operation 410 is discussed further in FIG. 5 below.

In operation 412, an index manager may initiate a rebuilding of one or more indexes for the copied data at substantially the same time as the reading of the copied data (i.e., part of operation 406 and operation 410). In some embodiments, this may occur when the index manager receives sorted index keys after the index keys have been extracted from database records of the data (e.g., after operation 408). The index manager may then generate the indexes according to how the index keys are sorted.

In various embodiments, a recovery manager may perform operation 414 to apply the log data from one or more transaction logs to the rebuilt indexes in operation 412 and data restored from operation 406 in order to recover the data to a desired point in time. Accordingly, the APPLYLOG phase may roll forward or write the transaction information to the database file to perform a point in time recovery.

Figure 5:
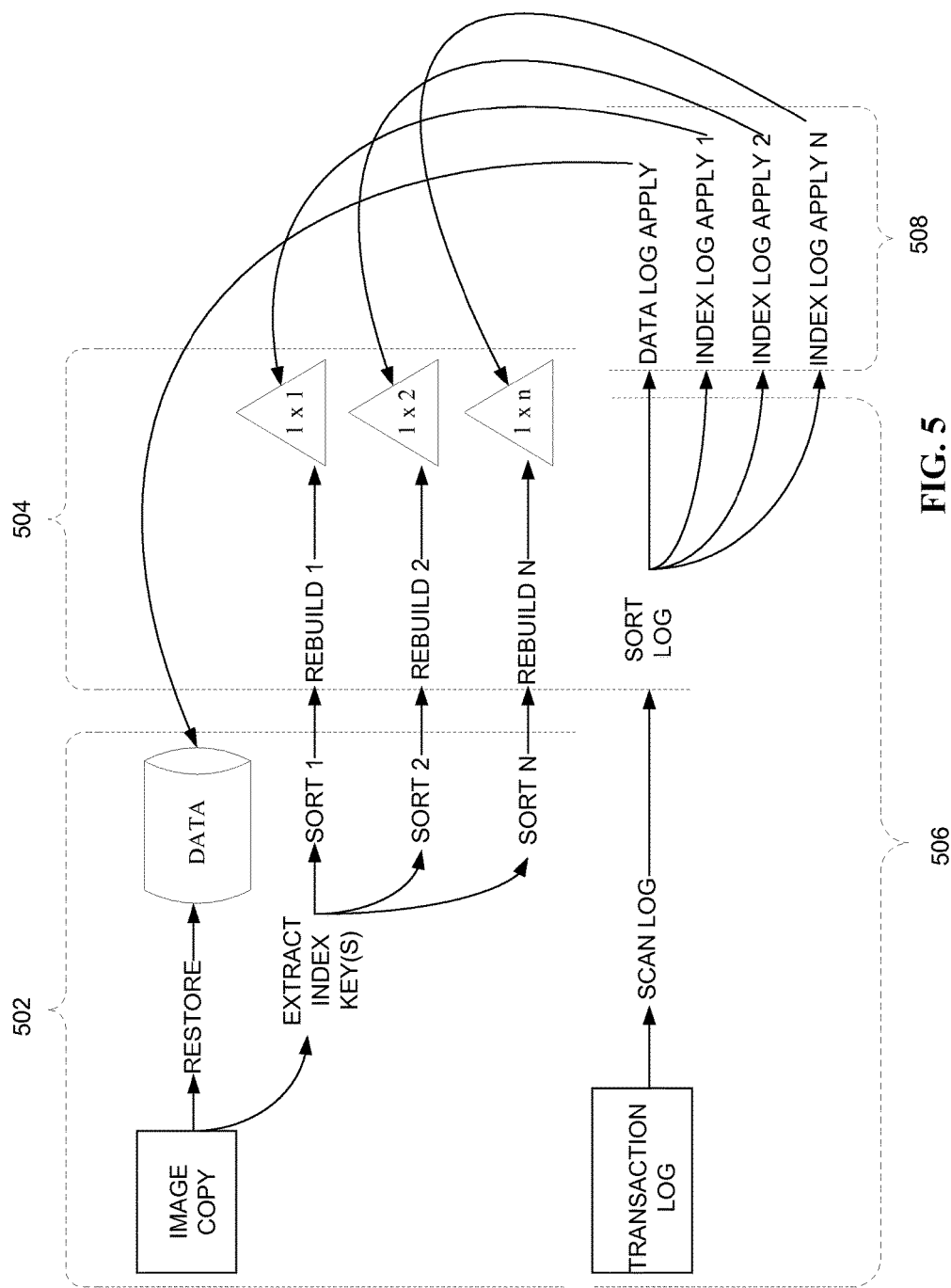
FIG. 5 is a diagram illustrating an embodiment of how various elements of the present disclosure work together according to different time sequences.

FIG. 5 is a diagram illustrating an example embodiment of how various elements of the present disclosure work together according to different time sequences. In this diagram, the left side of the figure may represent a shorter time sequence than the right side of the figure. For example, steps 502 and 506 (outlined in dotted line brackets) may be initiated at first time sequence (e.g., simultaneously). Step 504 may be initiated at a second time sequence. And step 508 may be initiated at a third time sequence. The third time may be subsequent to the second time and the second time may be subsequent to the first time. In step 502 at the first time sequence, an image copy of data from a backup file may be restored (read and written) to a database file. Included in the same data read, an index manager or recovery manager may extract index keys from the image copy for particular columns in a table, in preparation for rebuilding indexes. In this example, there may be a SORT 1 category for index keys to be organized. For example, leaf node level keys may be sorted, which may correspond to organizing a first set of data pages and database records derived from the image copy according to the index structure (e.g., clustered, non-clustered, etc.). There may be a SORT 2 category (e.g., organizing a second set of leaf node level keys), and a SORT N category (e.g., organizing various other leaf node level keys). The exact "N" value (SORT N, REBUILD N, INDEX LOG APPLY N) may depend on the quantity of data that a user needs for recovery. The more data that a user recovers, the more indexes that may need to be built for the data.

At the first time sequence, in step 506, a recovery manager or log manager may scan (read) a transaction log and sort individual log records based on the object needed for recovery. For example, if there was a user error that deleted 30 database records between 9 a.m. and 5 p.m. on a particular day, and an image copy (snapshot) of a database was stored to a backup file at 12 a.m. on the same day, the image copy of the data may be restored, which may include the 30 deleted database records. However, the image copy may only include the database as it existed at 12 a.m. Accordingly, the image copy would not include all of the transactions needed that took place from 12:01 a.m. to 5 p.m. Therefore, a recovery manager may determine that it needs all of the transactions from a transaction log from 9 a.m. to 5 p.m. (except for the user error of 30 deleted database records). The recovery manager may then sort or bundle together all of the transactions that occurred from 9 a.m. to five p.m. in preparation to apply (write) them to the database and add them to index objects. In some embodiments, the sorting of log records may occur at the second time sequence in step 504. Accordingly, the recovery manager may communicate with an index manager to determine how extracted index keys are being sorted (e.g., SORT 1, SORT 2, and SORT N), and sort corresponding log records for the indexes in preparation for writing.

At the second time sequence, in step 504, an index manager may rebuild indexes, which corresponds to how they were sorted from the image copy. For example, the SORT 1 index keys may be received by the index manager to rebuild the corresponding indexes (REBUILD 1). The SORT 2 keys may be utilized to rebuild the corresponding indexes (REBUILD 2). The SORT N keys may be utilized to rebuild the corresponding indexes (REBUILD N). As discussed above, the log records may also be sorted during the second time sequence in step 504.

In some embodiments, at the third time sequence, in step 508, the recovery manager may apply (write) all of the log record transaction information to the image copy and rebuilt indexes to restore a database file and index objects to a particular point in time. In other embodiments, step 508 can be initiated at the second time sequence. Accordingly, after step 502 occurs, namely the "RESTORE" of the "DATA," the "DATA LOG APPLY" portion of step 508 may occur before the indexes are rebuilt in step 504. In embodiments, a recovery manager may receive a first set of sorted log records and apply them to the restored image copy (DATA LOG APPLY). For example, using the illustration above, the transactions from 9 a.m. to 5 p.m. may be applied to the image copy of the database that only included transactions up until 12 a.m. The recovery manager may also receive a first sorted log record that corresponds to the REBUILD 1 index and apply the changes (INDEX LOG APPLY 1) to the rebuilt index derived from the image copy. The recovery manager may receive a second sorted log record that corresponds to the REBUILD 2 index and apply the changes (INDEX LOG APPLY 2). The recovery manager may also receive a third set of log records that corresponds to the REBUILD N index and apply the changes (INDEX LOG APPLY N). In these embodiments, the rebuilding of the indexes may accordingly finish at substantially the same time as the writing of the copied data (e.g., 0.1 seconds, 0.2, seconds, after writing the copied data, etc.). After the indexes are rebuilt from the image copy (e.g., REBUILD 1), additional index transactional information may become available from the transaction log that corresponds with the point in time needed for recovery. Therefore, the database manager may apply the additional indexes derived from the transaction log (e.g., INDEX LOG APPLY 1) to complete the rebuilding of all the indexes concurrent with the applying data from the transaction log to the image copy (e.g., DATA LOG APPLY).

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for recovering data and concurrently rebuilding indexes for the recovered data in a database for a system configured to store fewer than all indexes in backup files, comprising: copying data from one or more database files and storing the copied data to one or more backup files; reading the copied data from the one or more backup files, by a recovery manager executing on a processor, and writing the copied data to the one or more database files by the recovery manager, wherein the data is recovered to the one or more database files, and wherein one or more indexes are not recovered; in response to and at substantially the same time as the reading, initiating a rebuilding of the one or more indexes for the copied data, by an index manager executing on the processor, wherein initiating the rebuilding of the one or more indexes at substantially the same time reduces a quantity of 1/0 operations needed for data recovery; and in response to finishing the rebuilding of the one or more indexes, applying a first set of log records from a transaction log to the one or more database files, the one or more log records specify a particular point in time for recovery.

2. The method of claim 1, wherein the storing of the copied data to one or more backup files includes storing an image copy of the data to a sparse backup file, and storing a log record of the data to a transaction log, the sparse backup file includes an empty pages of data and is not allocated disk space for the data at a first time, wherein in response to a page of the one or more database files being modified at a second subsequent time, a size of the sparse file expands such that the sparse backup file pages are no longer empty.

3. The method of claim 1, wherein initiating of the rebuilding of one or more indexes includes receiving one or more sorted index keys by the index manager, and rebuilding the one or more indexes in response to the receiving of the one or more sorted index keys.

4. The method of claim 1, wherein the rebuilding of the one or more indexes finishes at substantially the same time as the writing of the copied data.

5. The method of claim 1, wherein the reading the copied data from the one or more backup files by the recovery manager includes: reading an image copy of one or more data pages of the copied data from a sparse backup file, the reading of the image copy further comprising: parsing the one or more data pages from the image copy into one or more database records, extracting one or more index keys from the one or more database records, and sorting the one or more index keys in preparation initiating of the rebuilding of one or more indexes; and reading one or more log records from a transaction log, wherein the one or more log records specify a particular point in time for recovery.

6. The method of claim 5, wherein the writing includes writing the image copy from the sparse backup file to the one or more database files and applying the one or more log records from the transaction log to the one or more database files.

7. The method of claim 6, wherein the reading of the image copy and the reading of the one or more log records is initiated at a first time, initiating of the rebuilding of one or more indexes occurs at a second time, and the applying of one or more log records is initiated at a third time, the third time being subsequent to the second time and the second time being subsequent to the first time.

* * * * *